(12) United States Patent
Chen et al.

(10) Patent No.: US 9,676,246 B2
(45) Date of Patent: Jun. 13, 2017

(54) SYSTEMS FOR IMPROVING CLIMATE COMFORT FOR REAR VEHICLE PASSENGERS

(71) Applicant: GM GLOBAL TECHNOLOGY OPERATIONS LLC, Detroit, MI (US)

(72) Inventors: Kuo-Huey Chen, Troy, MI (US); Taeyoung Han, Bloomfield Hills, MI (US); Bahram Khalighi, Troy, MI (US); Shailendra Kaushik, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 14/593,608

(22) Filed: Jan. 9, 2015

(65) Prior Publication Data

US 2015/0197136 A1  Jul. 16, 2015

Related U.S. Application Data

(60) Provisional application No. 61/926,598, filed on Jan. 13, 2014.

(51) Int. Cl.
*F25B 21/02* (2006.01)
*B60H 1/00* (2006.01)

(52) U.S. Cl.
CPC ..... *B60H 1/00285* (2013.01); *B60H 1/00021* (2013.01); *B60H 1/00478* (2013.01); *B60H 2001/002* (2013.01); *B60H 2001/003* (2013.01)

(58) Field of Classification Search
CPC .. F25B 21/02; B60H 1/00478; B60H 1/00371

USPC .......................... 62/3.61, 239, 244
See application file for complete search history.

(56) References Cited

U.S. PATENT DOCUMENTS

| | | | | |
|---|---|---|---|---|
| 4,981,324 A * | 1/1991 | Law | ........................ | A47C 7/74 297/180.11 |
| 6,119,463 A * | 9/2000 | Bell | .................... | B60H 1/00471 165/86 |
| 6,857,697 B2 * | 2/2005 | Brennan | .................. | A47C 7/74 297/180.12 |
| 6,976,734 B2 * | 12/2005 | Stoewe | ................ | B60N 2/5657 297/180.1 |

(Continued)

FOREIGN PATENT DOCUMENTS

| CN | 1306613 A | 8/2001 |
|---|---|---|
| CN | 1526585 A | 9/2004 |

OTHER PUBLICATIONS

CN Office Action dated Nov. 4, 2016 for related Chinese Patent Application No. 201510161379.9.

*Primary Examiner* — Melvin Jones
(74) *Attorney, Agent, or Firm* — Parks IP Law LLC; Mickki D. Murray, Esq.

(57) ABSTRACT

An air-delivery system, for use in a vehicle. The system includes a backrest of a vehicle seat assembly and an air-delivery port connected to or integral to the backrest. The system also includes an input conduit connected to the air-delivery port for delivering air received from an air source to the air-delivery port. The air-delivery port is configured and arranged in the backrest facing a generally aft direction to, during operation of the system, deliver air received from the air source aftward from the backrest.

22 Claims, 4 Drawing Sheets

(56) References Cited

U.S. PATENT DOCUMENTS

| | | | |
|---|---|---|---|
| 7,038,227 B2* | 5/2006 | Aust | F23D 14/14 250/493.1 |
| 2008/0168787 A1* | 7/2008 | Kameyama | B60H 1/00285 62/244 |

* cited by examiner

SYSTEMS FOR IMPROVING CLIMATE COMFORT FOR REAR VEHICLE PASSENGERS

TECHNICAL FIELD

The present disclosure relates generally to intra-vehicle air-control systems and, more particularly, to systems that are part of or connected to a vehicle seat assembly for delivering air, conditioned as desired or determined appropriate, selectively and more directly to a passenger seated behind the seat assembly.

BACKGROUND

Conventional vehicle air-delivery systems include vents located on a front dashboard of the vehicle. The vents are spaced relatively far from any passengers of second or subsequent rows. The spacing allows a relatively large amount of dispersion of the air leaving the vents before it reaches first and especially second-row occupants.

In some vehicles, second-row air vents are positioned on a ceiling or adjacent a floor in a center console. This spacing improves air controllability for rear passengers, but still results in a relatively high amount of dispersion before the air reaches the second-row passengers.

While the conventional vent positions and resulting dispersion are not shortcomings inherently, the present technology has been developed to accomplish heating, ventilating, and air-conditioning benefits that cannot be achieved by conventional systems.

SUMMARY

The present disclosure relates in one aspect to an intra-vehicle air-control system being a part of or connected to a rear side of a vehicle seat assembly for delivering air, conditioned as desired or determined appropriate, selectively to passengers seated in a second or subsequent row of the vehicle.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure.

While the present technology is described primarily in connection with automotive uses, the technology is not limited to automotive use. The technology may be used similarly in aircraft, marine craft, and other vehicle.

Overview of the Disclosure

In various embodiments, the present disclosure describes an intra-vehicle air-control system being a part of or connected to a backrest of a vehicle seat assembly for delivering air, conditioned as desired or determined appropriate, selectively to at least one passenger seated in a second or subsequent row of the vehicle.

Most conventional air-control systems are configured to disperse air to generally an entirety of the cabin from only dashboard vents of the vehicle. Some conventional air-control systems include ceiling air-delivery components, but no system positioned in close proximity to the passenger for directing air from a more-proximate, back-of-seat, position to a face and chest of the passenger.

In the air-control system, adjustable air vents are positioned on the seat for delivering conditioned air aft-ward, to the passenger seated behind the seat, to achieve better climate (e.g., thermal) comfort for the rear passenger. The vents may be referred to by other terms, such as nozzles, or ports.

Close proximity of the vents to the passenger fosters benefits including enabling faster attainment of desired climate comfort for the passenger. The climate can be changed as desired quickly due in large part to the relatively close proximity of the vents, being positioned on a seat backrest directly in front of the passenger, to the passenger body.

Another benefit fostered by the design is energy savings, as energy to bring substantially an entirety of a vehicle cabin to a desired climate condition is not needed for the passenger to be comfortable. Rather, a microclimate about the passenger only need be conditioned for the passenger to be comfortable.

Energy is also saved as less conditioning of the air and/or less air flow (e.g., lower volume and/or lower flow rate) is needed, because the conditioned air will more quickly reach the rear passengers, and so there will be less losses (e.g., warm air cooling or cool air warming) than if the air (e.g., conditioned air) had to travel a greater distance.

While conditioning air for the entire vehicle is sometimes desired, it is not always, and is actually relatively rarely, needed. Many vehicles are driven with only one rear passenger, and so conditioning both sides of a rear compartment, and perhaps additional rear compartments such as another row and/or a stowage area is not needed. If a sole passenger is in a third row of a vehicle, for instance, energy can be saved by controlling a microclimate about the passenger without having to condition the entire second row, or both the entire second row and a front passenger area.

Figure 1:
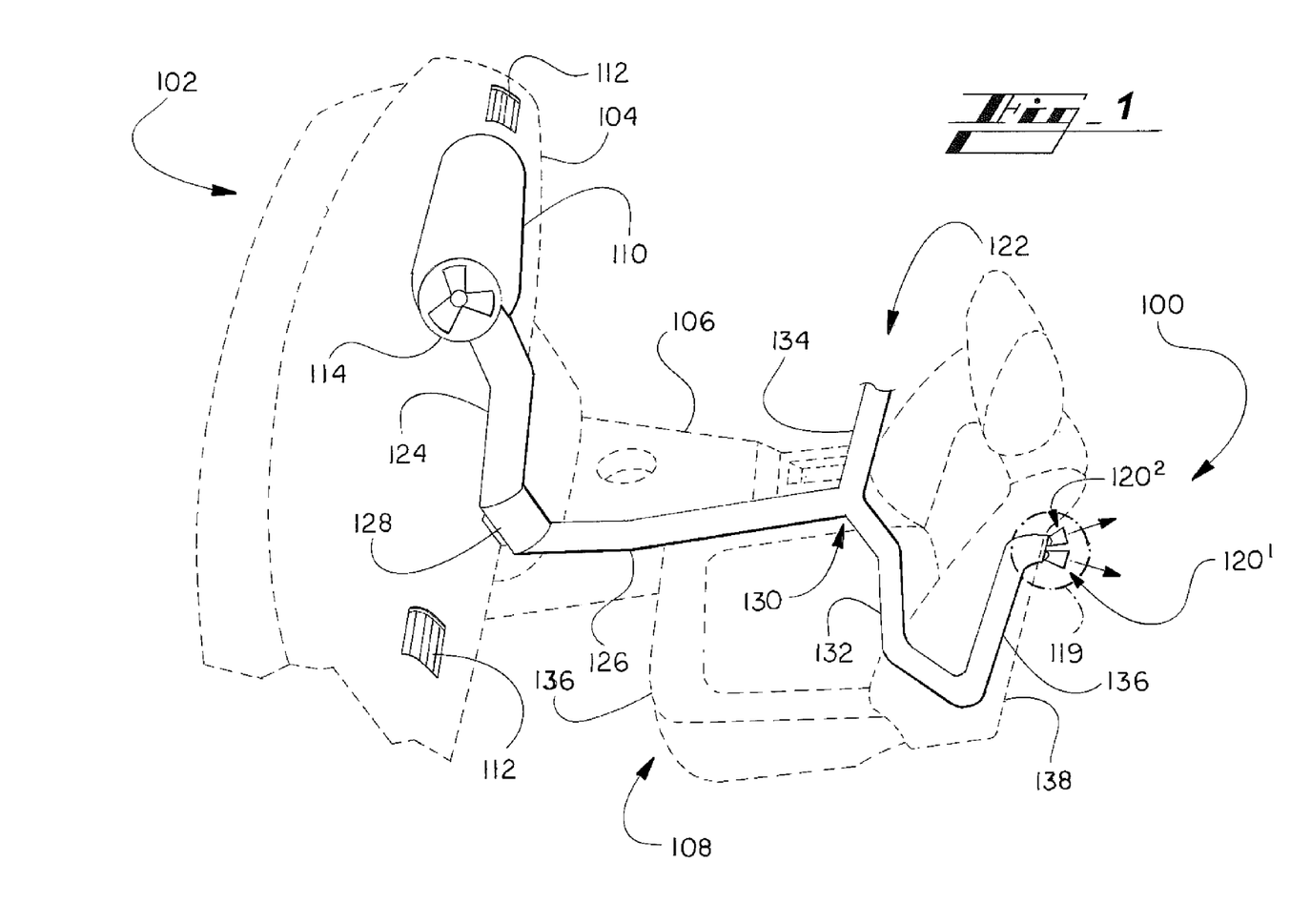
FIG. 1 is a perspective view of components of an air-delivery system installed on a vehicle.
Figure 2:
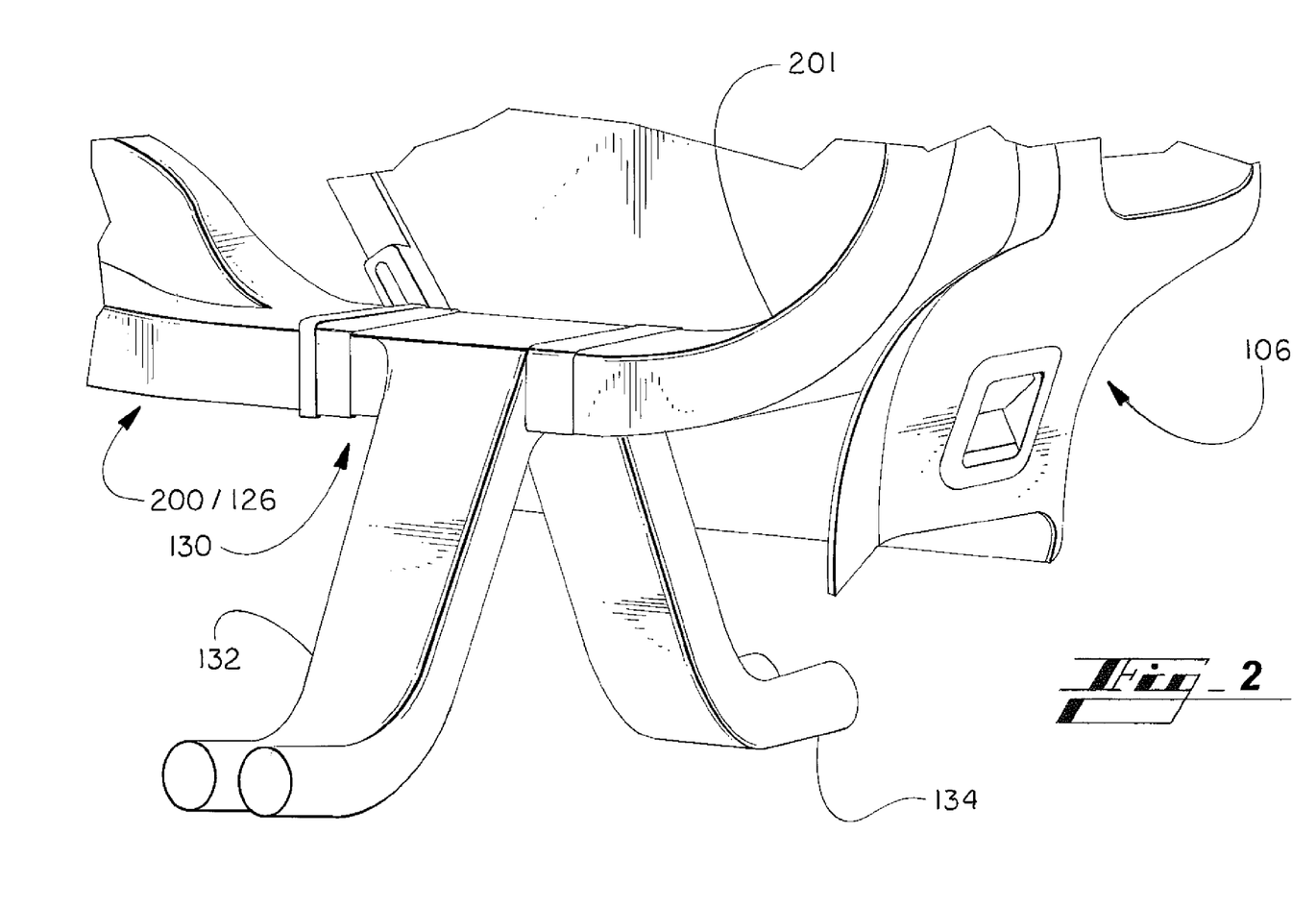
FIG. 2 is a perspective view of an air-duct junction of the air-delivery system of FIG. 1.

FIGS. 1 and 2

FIG. 1 is a perspective view of components, including air channels of an air-delivery system installed on a vehicle, which can also be referred to by terms such as ducts, ductwork, or plumbing. The air-delivery system is identified in the figure by reference numeral 100.

The system 100 is shown in FIG. 1 installed as part of a vehicle 102.

The vehicle 102 also comprises a dashboard 104 and a center console 106. The console 106 extends generally fore and aft along a center of the vehicle 102 between a driver seat 108 and a front passenger seat, not shown in FIG. 1.

The vehicle 102 also includes a main heating, ventilating, and air-conditioning (HVAC) system 110. The HVAC system 110 can in most or all ways be like a conventional HVAC system 110 used in vehicles. The primary conditioning components of HVAC systems are typically positioned behind (fore of) the vehicle dash 104.

While HVAC is described mostly herein as including heating and cooling air, the present technology includes in various embodiments other types of climate control. Ventilating for instance can include initiating circulation or other movement or blowing of air of any temperature, even at a temperature that is the same generally as that of the cabin or about the driver. As another example, in addition to heating and cooling, the air conditioning can include controlling a humidity or aridity of the air being emitted by the back-of-seat system of the present technology. Other controllable air-related characteristics include breeze, circulation, and ventilation.

Conventional main HVAC systems 110 are connected to multiple conventional-type openings or vents 112 by conventional plumbing (not shown in detail) such as A/C tubing or pipes. The main HVAC system 110 includes or is connected to a fan or blower 114. In operation, air is conditioned at the main HVAC system 100 and pushed by the blower 114 to the vents 112 for delivery to the vehicle cabin.

The air-delivery system 100 is in various embodiments configured and arranged to receive conditioned air from the main HVAC system and/or a local system. The local system can include a conditioning device, such as a thermoelectrical (TE) device.

Figure 5:
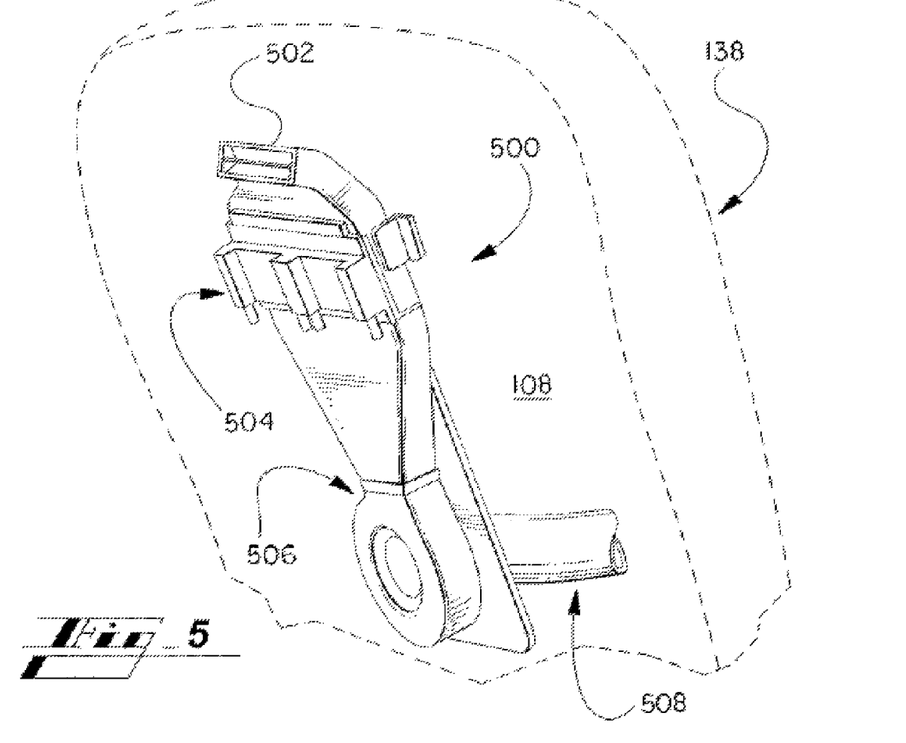
FIG. 5 is a perspective view of an example terminal portion of the air delivery system including an opening, an optional local air-conditioning device, and an optional local fan.

FIGS. 1 and 2 show aspects of the system 100 associated with delivering, from a rear of a driver seat, air that is received from the main HVAC system 110. FIG. 5 shows aspects of the system 100 associated with delivering from the seat air received from a local conditioning system, such as one including the TE device.

Again, these aspects can be used together selectively. An amount of air received from the main HVAC (0-100%) versus the local source (100-0%) can be controlled based on user input (e.g., driver or passenger input) to a vehicle-user interface, or system-user interface, or automatically by vehicle controls. The controls can include computerized features such as those shown in FIG. 6. These adjustment features are described more below.

With continued reference to FIG. 1, the air-delivery system 100 includes an air-delivery apparatus 119 including one or more terminal air-delivery component 120 from which air conditioned as desired (e.g., heated/cooled and/or humidity controlled by the main HVAC system 110) is delivered toward a passenger (not shown) seated behind (aft of) the seat 108. As shown in FIG. 1 and shown and described in more detail in connection with FIGS. 3 and 4, the air-delivery apparatus 119 of the system 100 can include at least two air-delivery components $120^1$, $120^2$.

While the system 100 is shown installed in connection with a driver seat 108, the system 100 can also be installed for delivering conditioned air from a front passenger seat, next to the driver seat 108, and/or from another vehicle seat behind which microclimate control is desired, such as using second row seat backrest for controlling climate of a third-row passenger.

For transporting air, to the terminal air-delivery component 120, the system 100 includes plumbing 122, such as A/C tubing or piping. The air can be, e.g., conditioned or unconditioned air from the main HVAC 110. A first branch 124 of the A/C tubing 122 is shown extending from the main HVAC unit 110 toward the center console 106 of the vehicle 102.

While the main blower 114 is shown connected directly to the main unit 110, tubing can be positioned intermediate the main unit 110 and the blower 114.

While the first branch tubing 124 is generally a single piece, the plumbing 122 can include two or more pieces of tubing in the place. Similarly, generally one component can be used in place of any two or more components described herein, and vice versa, in the system 100.

The first branch tubing 124 is shown, by way of example, extending from the main HVAC unit 110 toward the center console 106 of the vehicle 102. The system 100 includes a second branch tubing 126 extending, by way of example, through the console. While the plumbing 122 can extend from the main HVAC to the terminating ports 120 along a path other than through the center console 106, there are benefits to using the center console.

One benefit of using the center console 106 for routing the plumbing 122 is that, while vehicle space is very limited, the console 106 is likely to have some space therein that can be used for the purpose. Another potential benefit of using the center console 106 for routing the plumbing 122 is that the console is in many current vehicle designs used for routing other components from the dashboard area toward a rear of the console.

Existing components include, e.g., a wire harness for passing voltage to rear cabin electrical interfaces such as a radio connection, electrical socket, USB receptacle, etc. The electrical lines can be housed in a flexible hosing, casing, or housing. The casing, as already designed, or according to a modified design, can also house the present plumbing 122. Or the system 100 can be configured and arranged to connect to the casing or wiring otherwise.

The air-delivery system 100 in some embodiments includes an inline booster fan or blower 128. The fan boosts air pressure and flow between the lines 124, 126, minimizing overall loses in pressure and air flow rate through the plumbing 122 that would otherwise occur due to the relatively far distance between the main HVAC fan 114 and the outlet port(s) 120.

For embodiments of the air-delivery system 100 having back-of-seat outlet ports 120 in each of a driver-side and a passenger-side seat, the plumbing can include a joint or junction 130 at the main line 126. The junction 130 splits the main line 126 into a driver-side trunk 132 and a passenger-side trunk 134.

While the trunks 132, 134 are shown in FIG. 2 extending generally directly laterally from the main line 126 (i.e., about 90 degrees), in a contemplated embodiment, at least one of the separate trunks extends from the main HVAC 110 more aft-ward (e.g., 45 degrees, 25 degrees, or any degree less than 90 degrees), one leading to the respective seat.

The junction 130 receives air from the upstream conduit 200. The upstream conduit 200 in FIG. 2 can represent the upstream tubing 126 (shown in FIG. 1) of the plumbing 122 or a housing including or otherwise connected to the tubing 126. As in FIG. 1, FIG. 2 shows the input 200 splitting to the driver-side trunk 132 and passenger trunk 134.

The driver-side trunk 132 extends as shown in FIG. 1, under or through a bottom 136 of the driver seat 108. The trunk 132, adjacent plumbing components 134, 130, in some embodiments preferably has some flexibility (being, e.g., a flexible hose) to accommodate movement of the front seat—e.g., fore/aft and tilt adjustments.

The plumbing 122 proceeds by an additional trunk 136 extending upward in a backrest 138 of the seat 108. The plumbing branch 136 extends from the seat-bottom tubing 132 toward the dispensing port(s) 120. The dispensing port(s) 120 in some embodiments include an upper output port 120$^1$ and a lower output port 120$^2$, which are described more below in connection with FIGS. 3 and 4.

The passenger trunk 134 can extend in a similar manner, to similar components, with respect to the passenger seat that is not shown. To simplify the illustration, the passenger line 134 is shown truncated and further detail of passenger-side components of the system 100 are also not shown.

In some embodiments, the system 100 includes plumbing 201 extending downstream from the primary joint 130. The downstream branch 201 can serve HVAC vents at the rear of the console or at a rear floor, for instance.

Figure 3:
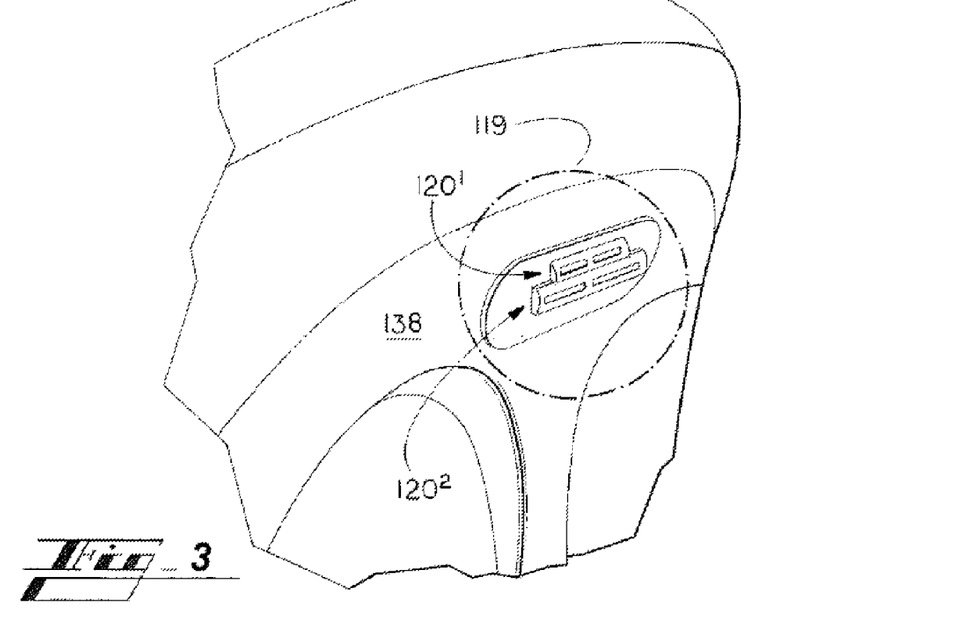
FIG. 3 is a perspective view of air-delivery-system openings positioned on a back side of a front-row vehicle seat.
Figure 4:
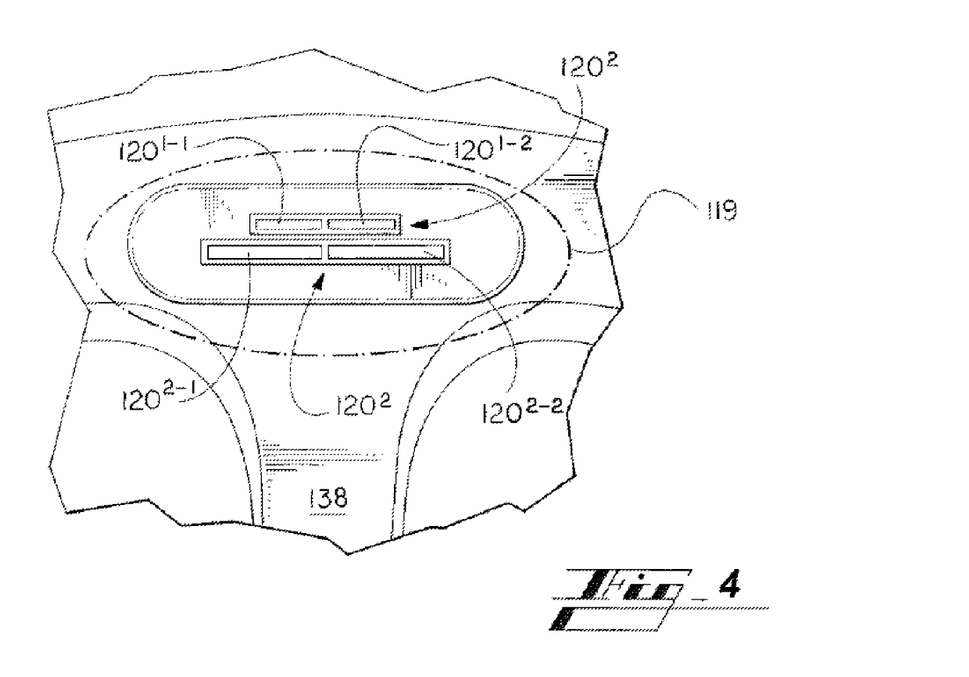
FIG. 4 is a view of the front-row seat showing the terminal openings.

FIGS. 3 and 4

FIG. 3 is a perspective view of the air-delivery apparatus 119 shown in FIG. 1. The apparatus 119 includes two air-delivery components, an upper component 120$^1$ and a lower component 120$^2$, positioned on a back side of a seat 108—e.g., driver seat.

Each component 120$^1$, 120$^2$ includes at least one air-delivery opening. As with other parts described herein, each air-delivery opening may be referred to by other terms. Other terms include air-delivery opening, air-delivery port, and air-delivery nozzle. The term air-delivery port, or simply port, is used primarily hereinafter for simplicity, and without limitation on the configuration or arrangement of the openings, to describe the terminal openings from which air is delivered from the system 100.

In the example of FIG. 3, the air-delivery ports 120 are positioned in a generally central area of the forward seat 108. Benefits of this positioning include being a good position from which to deliver air with little separation distance to the passenger face, neck, shoulder, and/or upper arm areas, for example.

Another benefit of the positioning is that the ports 120 would be in relatively-easy reach of the passenger for which the microclimate is being created. This is helpful for embodiments in which the system is configured so that air control (e.g., volume, flow rate, temperature, humidity level, etc.) can be done manually by the passenger. Still, the air-delivery components 120 can be positioned in other places, such as between the seat backrest 138 and a seat head rest (shown in FIG. 1), between the seat backrest and the head rest, and/or other parts of the seat 108.

FIG. 4 is a rear view of the driver seat showing the terminal openings. As shown in FIG. 3 and called out in FIG. 4, by way of example, each air-delivery component 120$^1$, 120$^2$ includes two openings, for a total of four openings 120$^{1-1}$, 120$^{1-2}$, 120$^{2-1}$, 120$^{2-2}$.

The air-delivery components 120$^1$, 120$^2$ and the openings thereof 120$^{1-1}$, 120$^{1-2}$, 120$^{2-1}$, 120$^{2-2}$ can have any of a wide variety of shapes without departing from the scope of the present technology. The ports and/or openings are in one embodiment generally circular, for example and can be referred to also as nozzles. The nozzle can cause air to emit from the system in a jet-like fashion. The ports and/or openings in some embodiments has a type of elongate shape, e.g., oval or rectangle, such as shown in FIGS. 3 and 4.

The air-delivery components 120$^1$, 120$^2$ and the openings thereof 120$^{1-1}$, 120$^{1-2}$, 120$^{2-1}$, 120$^{2-2}$ are in some embodiments configured and arranged so that, in operation, the components 120 tend to deliver air to a certain part of, or certain areas adjacent, the passenger. They may be configured and arranged, for example, so that the first component 120$^1$ tends to deliver conditioned air to higher portions of the passenger seated behind the seat 108—e.g., to a head area, or head and neck, or head, neck, and shoulders of the passenger. And they may be configured and arranged so that, e.g., the second component 120$^2$ tends to deliver conditioned air to mid-portion of the passenger—e.g., to a chest area or upper torso of the passenger.

The air-delivery components 120$^1$, 120$^2$ are adjustable in one or more manners so that the driver, a passenger, or control circuitry or a computing device can customize the air delivery. In a particular embodiment, e.g., the air-delivery components 120$^1$, 120$^2$ are adjustable manually by the driver. In another embodiment, in addition to or instead of being adjustable manually, each air-delivery component 120$^1$, 120$^2$ is adjustable by an actuator (not shown in detail) that is connected to the air-delivery component 120$^1$, 120$^2$, or at an upstream position of the system 100, and controllable by the driver and/or rear passenger, such as by a dashboard control, touch-screen display, voice commands, etc.

In some embodiments, one or both air-delivery components 120$^1$, 120$^2$ are adjustable for controlling at least direction of air flow. The components 120$^1$, 120$^2$ are in some embodiments configured and arranged to be rotated upward and downward selectively to facilitate creating the desired microclimate and thereby passenger comfort. The air-delivery components 120$^1$, 120$^2$ may be adjustable in any of multiple directions in various embodiments including also left and right. In some cases, the port(s) are adjustable in direction between laterally and vertically, such a being movable in 360 degrees. By adjusting the port(s), the driver, passenger, or vehicle can customize the direction that the air leaves the ports toward the rear-seated passenger.

The vehicle 102 can include controls by which the driver, passenger, and/or vehicle itself can control an amount of air that is delivered from a main HVAC source to the port(s) versus to another destination such as dashboard vents 112 shown also in FIG. 1.

The air-delivery components 120$^1$, 120$^2$ are in various embodiments configured (e.g., shaped and sized) and arranged (e.g., positioned, connected to and/or with respect to other parts) according to adjustment capabilities and/or any of a wide variety of considerations. A primary consideration is proximity to the passenger that would sit behind the driver seat 108 or other applicable vehicle seat.

When the air-delivery components 120$^1$, 120$^2$ are closer to a passenger, the air therefrom reaches the passenger more quickly, thereby affecting more quickly and maintaining more efficiently desired rear-seat passenger conditions corresponding to the air flowing from the ports.

By the increased efficiency, energy is saved, as less conditioning of the air and/or less air flow (e.g., lower volume and/or lower flow rate) is needed, because the conditioned air will more quickly reach the rear passengers, and so there will be less losses (e.g., warm air cooling or cool air warming) than if the air (e.g., conditioned air) had to travel a greater distance.

In these way, the technology facilitates occupant climate comfort in an improved manner by delivering conditioned air closer to the human body, particularly to the face, neck, shoulders, arms, and chest of the rear-seat passenger.

The technology in these and other described manners allows efficient and rapid creation of a desired microclimate around the passenger that can be controlled easily based on the individual comfort need.

Another consideration in designing the ports is size and shape of the ports and how they affect desired qualities such as flow rate, volume, and again direction of the air flowing from the port(s). Features of the source plumbing 122 also affects flow rate and volume, as does characteristics further upstream—e.g., upstream blower or fan, characteristics and function of other upstream outtakes from the plumbing 122 (to, e.g., dashboard vents 112, shown in FIG. 1), etc.

Shape or profile of the air column leaving the ports 120 is also affected, and so ports can be design to reach the desired result—e.g., air dispersion profile having a broader cone shape, a thinner or tighter cone shape, etc. As mentioned, the ports can have shapes other than those shown.

The ports can also be stacked, arranged in a matrix, or other configurations. FIGS. 3 and 4 show side-by-side openings $120^{1-1}$, $120^{1-2}$ in the first air-delivery component $120^1$ and side-by-side openings $120^{2-1}$, $120^{2-2}$ in the second air-delivery component $120^2$.

The technology presents an improved system for creating rear seat passenger comfort by delivering conditioned air (e.g., heated/cooled and/or moisture controlled) from a vehicle opening that is positioned on a back of a vehicle seat so that the opening is close to a body of the passenger. The air can be directed particularly to one or more parts of the body, such as to the face and chest. The air ports—e.g., air vents or nozzles—are thus closer to the area for which a microclimate (e.g., passenger-specific or passenger-focus climate zone) is desired.

Rear passenger climate (e.g., thermal) comfort can be achieved and improved significantly by placing the conditioned air ports closer to the targeted cooling/heating area in a vehicle. The current invention creates a microclimate on the rear passengers by installing air-delivery devices on the back of the front seats to quickly cool or warm both face and chest of the rear occupants to improve climate (e.g., thermal) comfort.

Due to the close position with respect to the occupant body, the amount of air flow and direction of air from the air ports can be personalized for an individual, versus an entire vehicle cabin or relatively large portion of the cabin, according to the individual comfort need.

The air source can be easily obtained from the main AC system by routing the air duct through the center console and connected to flexible hoses inside the front seats, as shown.

The vehicle may include a control mechanism (not shown), such as an adjustment knob mounted on a dashboard or on an instrument cluster hood of the vehicle. The control mechanism can be used for activating or adjusting the air-delivery system, such as controlling whether air is delivered, and if so an amount, rate, temperature, and/or humidity of air delivered to the air-delivery components 120.

Another example control mechanism can use a touch-screen display feature or a voice control system, for activating or adjusting the air-delivery system such as controlling whether and how much air is delivered to the air-delivery components 120.

The adjustment component can include any type of user-vehicle interface by which the driver or passenger can control at least the amount of air that flows from the port(s) 120, including a level of nil.

In one embodiment, the air-delivery components 120 themselves are each configured to allow the passenger to adjust flow, and so act as the adjustment component. As an example, each component 120 can be configured to be moved—e.g., turnable—to control air flow.

In one embodiment, the adjustment component, whether a knob or other type, e.g., the ports 120 themselves, when turned or otherwise effected in a first direction or manner, results in an increase in the amount air flowing from a main HVAC source toward the ports 120. This also results in less air flowing toward other destinations such as dashboard openings 112. And, vice versa—the interface, when turned or otherwise effected in a second direction or manner results in a decrease in the amount air flowing from a main HVAC source toward the ports 120 and so more toward other destinations such as dashboard openings 112.

The adjusting can control flow-affecting apparatus to control a percentage of air delivered to the dashboard vents, anywhere between 0% and 100%, versus the air-delivery components 120, anywhere between 100% and 0%. An example flow-affecting apparatus includes valve components (e.g., flaps), such as of a Y-valve (not shown).

The apparatus can be pneumatically controlled, by electric actuator, or otherwise. In one embodiment, automatic controls of the valve can be configured so that source air from one or both sources is used in a manner to obtain the desired microclimate in as efficient a manner as possible. The efficiency consideration can be present always or at least in a pre-set efficiency or green mode. In one embodiment, the efficiency or green mode is set in system circuitry, such as by being programmed in instructions of the computing device.

In embodiments in which the adjusting component has other configurations, such as by including a touch-sensitive display or a voice system, the system is configured to control air flow by being connected to the flow-affecting apparatus.

As can also be easily viewed in FIG. 1, the port(s) 120 would have much greater proximity to a rear-seat passenger (not shown) as compared to the fore dashboard vents 112. Benefits of greater proximity include those mentioned above—when the ports 120 are closer to the passenger, the air therefrom reaches the passenger relatively quickly, thereby affecting more quickly and maintaining more efficiently desired passenger conditions corresponding to the air flowing from the ports 120.

FIG. 5

FIG. 5 is a perspective view of an example terminal portion 500 of the air-delivery system including an opening 502, an optional local air-conditioning device 504, and an optional local fan 506.

The arrangement 500 includes an input 508. The input 508 can include piping such as input piping 132, 134, 136 shown in FIGS. 1 and 2. The input 508 can also include input wiring (not shown in detail) for delivering signals and/or voltage to the local air-conditioning device 504.

The opening 502 can represent either or both of the air-delivery openings 120 shown in FIGS. 1, 3, and 4

The local air-conditioning device 504 is in some embodiments a thermoelectric (TE) device, or TED. While other temperature changing devices can be used, the device 504 is referred to primarily herein as the TE device for simplicity. The TE device 504 can heat and/or cool air before it is delivered from the opening 502.

In operation, TE devices convert electrical voltage to temperatures such as input voltages of a first polarity cause the TE device heat, and so heat air that is in, adjacent, or passing through the TED. And input voltages of a second polarity cause the TE device to cool, and so cool air that is in, adjacent, or passing through the TE device.

The TE device 504 can include or be connected to the fan, pump, blower 506, or other air propulsion component for motivating air through toward the opening 502. In one embodiment, the TE device 504 is connected, such as by one or more vents (not shown in detail) to a cabin of the vehicle (e.g., adjacent the seat 108), from which it receives input air for passing through the TE device and on, conditioned, to the opening 502.

One consideration for TE device location is that it is generally preferable to position the TE device as close to the port(s) 502, e.g., nozzles, as possible or feasible. A benefit of such positioning is that the air leaving the TE device travels less distance, and so the conditioning affected by the TE is delivered to the ports more quickly, and so before much of the conditioning is undone in transport.

For embodiments in which the ports 502 also receive conditioned air from the main HVAC unit (e.g., unit 110 of FIG. 1), the conditioned air, or re-conditioned or further conditioned air leaving the TE device travels significantly less distance than conditioned air leaving the HVAC main unit would travel is piped directly to the ports 502 without the TE device.

Another consideration for TE device positioning is that when the TE device is closer to the output port(s) 502, and so there will be less of the mentioned losses due to distance, less energy is required to condition the air sufficiently for delivery from the air-delivery system as desired. In this way, in addition to by the relatively close proximity of the port(s) 502 of the system to the passenger, and along with or instead of by conditioning air without using or using to a minimum degree the main HVAC, energy can be saved.

Also for embodiments in which the port(s) 502 also receives conditioned air from the main HVAC unit (e.g., unit 110 of FIG. 1), the TE device 504 can be included in the arrangement 500 (FIG. 5) as a primary or supplementary temperature control device. In one embodiment, for instance, the arrangement 500 is connected to the main HVAC source (not shown), delivering conditioned air to the arrangement, such as via the input 508. When air from the HVAC would not be warm enough, or cool enough, for example, to condition the air sufficiently or as quickly as desired, the TE device 504 can supplement the main flow, adding extra warmth or cooling as needed.

In some embodiments, the TE device 504 is activated selectively. The TE device 504 can be activated to replace conditioning functions of the main flow (from, e.g., the main HVAC 110), or to supplement the main flow, adding extra warmth or cooling as needed. Activation of the TE device path is in various implementations manual and/or automatic.

Manual activation of the TE device or device path can be performed via a knob, touch-screen, or voice system, or other control part as described above regarding air-flow control.

The TE device is connected to circuitry and/or computing apparatus controlling the temperature that the TE device is operated at. Again, such devices can in some cases be controlled by an amount and polarity of input voltage. An example computing apparatus is shown and described in connection with FIG. 6. The circuitry or computing apparatus can be the same as that controlling the temperature of air provided by the main HVAC, for instance.

In a contemplated embodiment, one or more HVAC functions are performed via the main HVAC while another one or more functions are performed via the TE device. The main HVAC path may be used to condition a humidity or moisture level of air delivered to the on-column system 100, for instance, while the TE device is used to condition air temperature (e.g., heat or cool).

In another particular embodiment using the TE device, the opening(s) 502 is/are connected to the TE device and not connected to a main HVAC source 112. In this case, all air-conditioning functions (e.g., heating and cooling, and perhaps other functions such as controlling moisture level, etc.) are performed in the TE device.

Figure 6:
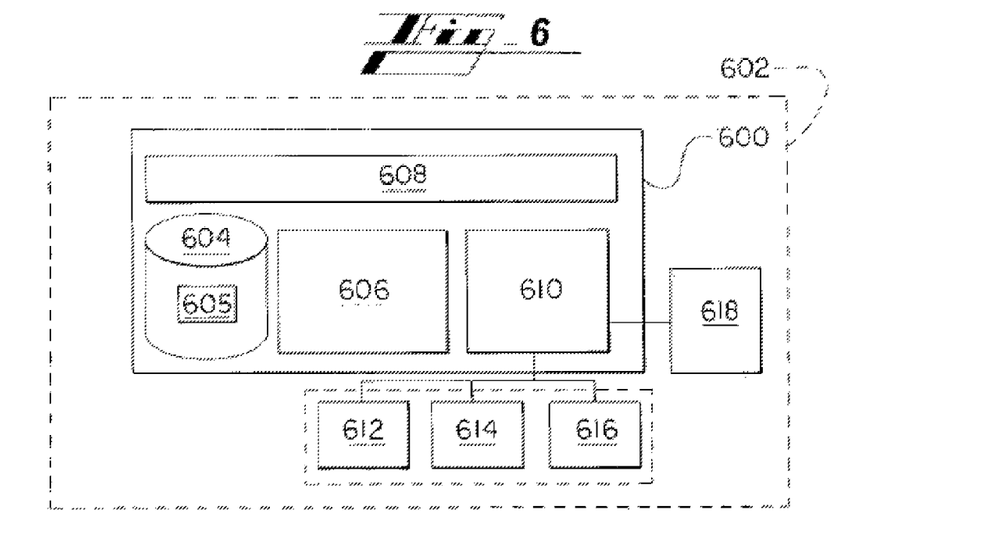
FIG. 6 is an example computing apparatus for use in connection with the present technology.

FIG. 6

FIG. 6 shows an example computing device 600. The device 600 is part of the vehicle 602 and, like any part described herein, can be considered a sub-system of a general system of the present technology.

The device 600 includes a computer-readable memory, such as a tangible or non-transitory computer-readable storage device 604 storing computer-executable code, or instructions 605. The device 600 also includes a processor 606 in communication with the memory by a channel 608 such as a wired data bus or wireless infrastructure (e.g., wireless transceivers).

The processor is configured to execute the instructions 605 to perform operation stipulated by the instructions for performing any of the automated functions described, required, or apparent based on the descriptions of the present technology provided herein.

The device 600 also includes an interface 610 for sending, or sending and receiving communications, signals, and/or data from and to the device 600. The interface can include wired and/or wireless communication structure. Extra-device apparatus that may communicate with the interface 610 can include an air-conditioning controller 612 (e.g., TED, main HVAC heating/cooling element, humidity controller, etc.), air-delivery port selection controller 614, and air-delivery directional controller 616. Example input components include driver-vehicle interfaces 618 such as an air-flow rate control component (e.g., knob), touch-sensitive display, voice control sub-system, etc.

Select Features of the Technology

In this section, some of the advantages of the present technology that are described above are further emphasized and some additional benefits are mentioned. The benefits mentioned are not comprehensive, but merely illustrative of the advantages of the present technology.

The benefits of the technology include being able to obtain a faster and improved climate (e.g., thermal) comfort for a vehicle passenger, to enable personalized microclimate control for the passenger, and to save HVAC energy usage.

The proposed design delivers conditioned air to the targeted cooling/heating area more effectively due to its proximity to the occupant.

Rear-seat passenger climate (e.g., thermal) comfort is improved in some embodiments by user-adjustable port control and efficient use of the air distribution.

In addition to the increased passenger comfort, localized climate delivery can potentially save energy costs. When combined with localized TE air supply, the proposed design can reduce HVAC power consumption without compromising occupant climate (e.g., thermal) comfort. Energy is saved, for example, when main HVAC system of the vehicle is turned down or off and passenger comfort is maintained or enhanced using the localized air-delivery arrangement, which draws less power. Even if the main HVAC system is turned down and left on, energy can be saved by maintaining passenger comfort by supplementing the main system with the localized air-delivery arrangement.

Energy is saved by positioning of the air-delivery component—e.g., air-delivery port. When the ports are closer to the passenger, the conditioned air delivered therefrom reaches the passenger more quickly, thereby affecting more quickly and maintaining more efficiently desired passenger conditions corresponding to the air flowing from the ports.

By the increased efficiency, energy is saved, as less conditioning of the air and/or less air flow (e.g., lower volume and/or lower flow rate) is needed, because the conditioned air will more quickly reach the passenger, and so there will be less losses (e.g., warm air cooling or cool air warming) than if the conditioned air had to travel a greater distance. In these ways, the technology facilitates occupant climate comfort in an improved manner by delivering conditioned air closer to the human body, particularly to the face, arms, neck, and/or chest of the passenger.

By the energy savings enabled, the technology also thereby improves the vehicle power rating, particularly its HVAC system power rating.

CONCLUSION

Various embodiments of the present disclosure are disclosed herein. The disclosed embodiments are merely examples, which may be embodied in various and alternative forms, and combinations thereof, and which are set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. An air-delivery system, for fostering a customized microclimate for a rear passenger of a vehicle, comprising:
a backrest of a vehicle seat assembly;
an air-delivery port constituent to the backrest; and
an input conduit connected to the air-delivery port for delivering air received from an air source to the air-delivery port;
wherein the air-delivery port is directed in a generally aft direction of the backrest to, for comfort of the rear passenger in use of the system, deliver air received from the air source aftward from the backrest.

2. The system of claim 1 wherein the air-delivery port is adjustable by way of automated controls.

3. The system of claim 1 further comprising an intermediate air pump connected to the input conduit, downstream of a primary air pump, when the system is installed in the vehicle.

4. The system of claim 1 wherein:
the air-delivery port is a first air-delivery port;
the first air-delivery port is part of an air-delivery apparatus comprising also a second air-delivery port; and
the first air-delivery port is positioned above the second air-delivery port in the air-delivery apparatus.

5. The system of claim 1 wherein:
the air source comprises:
a thermoelectric (TE) device; and
a main vehicle heating, ventilating, and air conditioning (HVAC) source connected also to vehicle HVAC openings distinct from the air-delivery port; and
the system further comprises at least one sub-system selected from a group consisting of:
a user-system interface configured and arranged to, in operation of the system, allow selective vehicle-user control of an amount of air received at the air-delivery port from the main HVAC source versus an amount of air received at the air-delivery port from the TE device; and
an automated sub-system configured and arranged in the system to, in operation of the system, control an amount of air received at the air-delivery port from the main HVAC source versus an amount of air received at the air-delivery port from the TE device.

6. An air-delivery system, for fostering a customized microclimate for a rear passenger of a vehicle, comprising:
a backrest of a vehicle seat assembly; and
an air-delivery port constituent to the backrest and directed in a generally aft direction of the backrest to, for comfort of the rear passenger in use of the system, deliver aftward, from the backrest, air received at the air-delivery port.

7. An air-delivery system, for fostering a customized microclimate for a rear passenger of a vehicle, comprising:
an air-delivery port configured to be constituent to a backrest of a vehicle seat assembly and directed in a generally aft direction of the backrest to, for comfort of the rear passenger, deliver air received from an air source aftward from the backrest; and
an input conduit connected to the port for delivering air from the air source to the air-delivery port.

8. The system of claim 7 further comprising the backrest.

9. The system of claim 7 wherein the air-delivery port is adjustable by way of automated controls.

10. The system of claim 7 further comprising the air source, the air source including a thermoelectric device positioned within the vehicle seat assembly.

11. The system of claim 7 further comprising an intermediate air pump, for connection and operation downstream of a primary heating, ventilating, and air-conditioning air pump.

12. The system of claim 7, wherein:
the air-delivery port is a first air-delivery port;
the first air-delivery port is part of an air-delivery apparatus comprising also a second air-delivery port; and
the first air-delivery port is positioned above the second air-delivery port in the air-delivery apparatus.

13. The system of claim 12 wherein the first air-delivery port is configured and arranged to direct air from the air-delivery apparatus toward an upper portion of the passenger and the second air-delivery port is configured and arranged to direct air from the air-delivery apparatus directly toward a lower portion of the passenger, below the upper portion.

14. The system of claim 12 wherein each of the first air-delivery port and the second air-delivery port is adjustable by way of automated controls.

15. The system of claim 7 further comprising a user-system interface configured and arranged to allow control of one or both of an amount and a temperature of air delivered from the air-delivery port.

16. The system of claim 7 wherein:
the air source comprises a main heating, ventilating, and air conditioning (HVAC) source connected also to vehicle HVAC openings distinct from the air-delivery port; and
the input conduit connects to the HVAC source behind a vehicle cabin surface.

17. The system of claim 16 wherein:
the air source comprises a thermoelectric (TE) device; and
the system comprises a user-system interface configured and arranged to, in operation of the system, allow selective vehicle-user control of an amount of air received at the air-delivery port from the main HVAC source versus an amount of air received at the air-delivery port from the TE device.

18. The system of claim 16 wherein:
the air source comprises a thermoelectric (TE) device; and
the system comprises an automated sub-system configured and arranged in the system to, in operation of the system, control an amount of air received at the air-delivery port from the main HVAC source versus received at the air-delivery port from the TE device.

19. The system of claim 1 wherein:
the air source comprises a main heating, ventilating, and air conditioning (HVAC) source connected also to vehicle HVAC openings distinct from the air-delivery port; and
the input conduit connects to the HVAC source behind a vehicle cabin surface.

20. The system of claim 6 wherein:
the air-delivery port is a first air-delivery port;
the first air-delivery port is part of an air-delivery apparatus comprising also a second air-delivery port; and
the first air-delivery port is positioned above the second air-delivery port in the air-delivery apparatus.

21. The system of claim 20 wherein the first air-delivery port is configured and arranged to direct air from the air-delivery apparatus toward an upper portion of the passenger and the second air-delivery port is configured and arranged to direct air from the air-delivery apparatus directly toward a lower portion of the passenger, below the upper portion.

22. The system of claim 4 wherein the first air-delivery port is configured and arranged to direct air from the air-delivery apparatus toward an upper portion of the passenger and the second air-delivery port is configured and arranged to direct air from the air-delivery apparatus directly toward a lower portion of the passenger, below the upper portion.

* * * * *